US011877389B2

(12) United States Patent
Schoelen et al.

(10) Patent No.: US 11,877,389 B2
(45) Date of Patent: Jan. 16, 2024

(54) ADDITIVELY MANUFACTURED ENERGETIC MATERIAL ANTI-TAMPER FEATURE AND IMPLEMENTATION

(71) Applicant: Rockwell Collins, Inc., Cedar Rapids, IA (US)

(72) Inventors: Mark Andrew Schoelen, Dallas, TX (US); Thomas Michael Deppert, Gilbert, AZ (US); Reginald Bean, Center Point, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 143 days.

(21) Appl. No.: 17/120,574

(22) Filed: Dec. 14, 2020

(65) Prior Publication Data

US 2022/0192012 A1 Jun. 16, 2022

(51) Int. Cl.
*G06F 21/86* (2013.01)
*H05K 1/02* (2006.01)
*C06B 33/00* (2006.01)
*C06C 15/00* (2006.01)
*H01L 23/00* (2006.01)

(52) U.S. Cl.
CPC ........... *H05K 1/0275* (2013.01); *C06B 33/00* (2013.01); *C06C 15/00* (2013.01); *G06F 21/86* (2013.01); *H01L 23/573* (2013.01)

(58) Field of Classification Search
CPC .. G06F 21/68; G06F 21/87; G06F 2221/2143; G06F 21/86
See application file for complete search history.

(56) References Cited

U.S. PATENT DOCUMENTS

| | | | |
|---|---|---|---|
| 5,121,329 A | 6/1992 | Crump | |
| 8,231,748 B1* | 7/2012 | Higa | C06B 33/00 149/109.2 |
| 9,536,844 B1 | 1/2017 | Brewer et al. | |
| 10,043,765 B2 | 8/2018 | Cabral, Jr. et al. | |
| 10,290,594 B2 | 5/2019 | Cabral, Jr. et al. | |
| 10,579,833 B1 | 3/2020 | Cook et al. | |
| 2009/0139422 A1* | 6/2009 | Mohler | G11B 23/0035 102/202.9 |
| 2018/0096954 A1* | 4/2018 | Cabral, Jr. | H01L 23/573 |

OTHER PUBLICATIONS

Church et al., "Advanced Printing for Microelectronic Packaging", nScrypt, Feb. 2014, pp. 1-8.
Comet et al., "Energetic Nanoparticles and Nanomaterials for Future Defense Applications", Human Factors and Mechanical Engineering for Defense and Safety, 2019, pp. 1-6.
(Continued)

*Primary Examiner* — Jeremy C Norris
(74) *Attorney, Agent, or Firm* — CANTOR COLBURN LLP

(57) ABSTRACT

An apparatus with an anti-tamper architecture includes a substrate and a layer of a pyrotechnic composite arranged on a surface of the substrate. The pyrotechnic composite includes a metal and a metal oxide, and the layer has a thickness of about 1 micrometer to about 10 millimeters. A reaction of the pyrotechnic composite is an exothermic reaction and at least partially fractures the substrate after the reaction is initiated.

7 Claims, 6 Drawing Sheets

(56) References Cited

OTHER PUBLICATIONS

Fleck, Trevor J. "Additive Manufacturing of Energetic Materials and Its Uses in Various Applications", MS Thesis, Purdue University, 2017, pp. 1-65.
Germann, Bryan "Avoiding the downfalls of bond wires with printed interconnects", Chip Scale Review, 2019, pp. 1-4.
Kirchdoerfer et al., "Topology Optimization of Solid Rocket Fuel", AIAA Journal, vol. 57, No. 4, Apr. 2019, pp. 1684-1690.
Martirosyan et al., "Modeling and simulation of pressure waves generated by nano-thermite reactions", Journal of Applied Physics, 2012, pp. 1-10.
Micron "BGA Manufacture's User Guide for Micron BGA Parts: Customer Service Notes", Micron Technology, Apr. 2020, pp. 1-13.
Muravyev et al., "Progress in Additive Manufacturing of Energetic Materials: Creating the Reactive Microstructures with High Potential of Applications", Propellants Explos. Pyrotech, 2019, pp. 941-969.
Perez et al., "Combining Additive Manufacturing and Direct Write for Integrated Electronics—A Review", 24th International SFF Symposium, 2013, pp. 962-979.
Schaefer et al., "Safety and Handling of Nano-aluminum", ATK, Nov. 2007, pp. 1-10.
Wang et al., "Influencing Factors of High-Pressure Discharge Nanothermite Composites Based on Al/Bi2O3", Combustion, Explosion, and Shock Waves, vol. 55, No. 2, 2019, pp. 184-190.
Wang et al., "The behavior of nanothermite reaction based on Bi2O3/Al", Journal of Applied Physics, 2011, pp. 1-8.
Westphal et al., "The Effects of Confinement on the Fracturing Performance of Printed Nanothermites", Propellants Explos. Pyrotech, 2019, pp. 47-54.
Williams, Rayon "Ignition mechanism in nanocomposites thermites", NJIT Dissertation, Aug. 2014, pp. 1-237.
Yetter, Richard A. "Combustion of Energetic Materials", 2018 CEFRC CSS, 2018, pp. 1-48.
Aerosol Jet Printed Electronics Overview, OPTOMEC, Additive Manufacturing Systems, 2017, 6 pages.
Cuan-Urquizo, E, et al. Characterization of the Mechanical Properties of FFF Structures and Materials: A Review on the Experimental, Computational and Theoretical Approaches, Materials 2019, 12(6), 895, Mar. 2019.

* cited by examiner

ADDITIVELY MANUFACTURED ENERGETIC MATERIAL ANTI-TAMPER FEATURE AND IMPLEMENTATION

BACKGROUND

Exemplary embodiments pertain to anti-tamper implementations, and more particularly, to additively manufactured energetic material anti-tamper methods and apparatuses.

Systems utilized in various fields include access sensitive information and technology (ASIT) that needs to be protected from unauthorized access, exposure, or distribution. In order to protect the sensitive information and technology, various anti-tamper architectures are employed. Anti-tamper deters reverse engineering of critical technology to impede technology transfer, alteration of system capability, and prevent development of countermeasures.

BRIEF DESCRIPTION

Disclosed is an apparatus with an anti-tamper architecture which includes a substrate and a layer of a pyrotechnic composite arranged on a surface of the substrate. The pyrotechnic composite includes a metal and a metal oxide, and the layer has a thickness of about 1 micrometer to about 10 millimeters. A reaction of the pyrotechnic composite is an exothermic reaction and at least partially fractures the substrate after the reaction is initiated.

Also disclosed is an apparatus, wherein the metal has a particle size of about 50 to about 150 nanometers, and the metal oxide has a particle size of about 40 to about 50 nanometers.

Also disclosed is an apparatus, wherein the pyrotechnic composite is a nanothermite.

Also disclosed is an apparatus, wherein the pyrotechnic composite is aluminum-molybdenum (VI) oxide, aluminum-copper (II) oxide, aluminum-iron (II, III) oxide, aluminum-bismuth (III) oxide, or aluminum-tungsten (VI) oxide hydrate.

Also disclosed is an apparatus, wherein the reaction is a redox reaction.

Also disclosed is an apparatus, wherein the substrate is a bare die, a system in package (SiP), a circuit board, a microelectronic device, an electronic device, a backplane connector, an ethernet physical layer device, or a mobile phone Wi-Fi antenna.

Also disclosed is an apparatus, further including electrical circuitry for initiating the reaction of the pyrotechnic composite arranged on the substrate.

Disclosed is a method for forming an anti-tamper feature on an apparatus. The method includes depositing, by an additive manufacturing method, a layer of an energetic material on a surface of a substrate. The layer has a thickness of about 1 micrometer to about 10 millimeters. A reaction of the energetic material is exothermic and at least partially fractures the substrate after the reaction is initiated.

Also disclosed is a method, wherein the additive manufacturing method is a direct write method, an aerosol jet method, or a fused filament fabrication method.

Also disclosed is a method, wherein a metal of the energetic material has a particle size of about 50 to about 150 nanometers, and a metal oxide of the energetic material has a particle size of about 40 to about 50 nanometers.

Also disclosed is a method, wherein the energetic material is a pyrotechnic material or an explosive material.

Also disclosed is a method, wherein the energetic material is aluminum-molybdenum (VI) oxide, aluminum-copper (II) oxide, aluminum-iron (II, III) oxide, aluminum-bismuth (III) oxide, or aluminum-tungsten (VI) oxide hydrate.

Also disclosed is a method, wherein the reaction is a redox reaction.

Also disclosed is a method, wherein the substrate is a bare die, a system in package (SiP), a circuit board, a microelectronic device, an electronic device, a backplane connector, an ethernet physical layer device, or a mobile phone Wi-Fi antenna.

Also disclosed is a method, further including forming electrical circuitry for initiating the reaction of the energetic material on the substrate.

Disclosed is a method for at least partially fracturing an apparatus with an anti-tamper feature. The method includes initiating a reaction of a layer of an energetic material arranged on a surface of a substrate. The energetic material includes metal and a metal oxide, and the layer has a thickness of about 1 micrometer to about 10 millimeters. The reaction of the energetic material is exothermic and at least partially fractures the substrate after the reaction is initiated.

Also disclosed is a method, wherein the metal has a particle size of about 50 to about 150 nanometers, and the metal oxide has a particle size of about 40 to about 50 nanometers.

Also disclosed is a method, wherein the energetic material is a nanothermite.

Also disclosed is a method, wherein the energetic material is aluminum-molybdenum (VI) oxide, aluminum-copper (II) oxide, aluminum-iron (II, III) oxide, aluminum-bismuth (III) oxide, or aluminum-tungsten (VI) oxide hydrate.

Also disclosed is a method, wherein the substrate is a bare die, a system in package (SiP), a circuit board, a microelectronic device, an electronic device, a backplane connector, an ethernet physical layer device, or a mobile phone Wi-Fi antenna.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
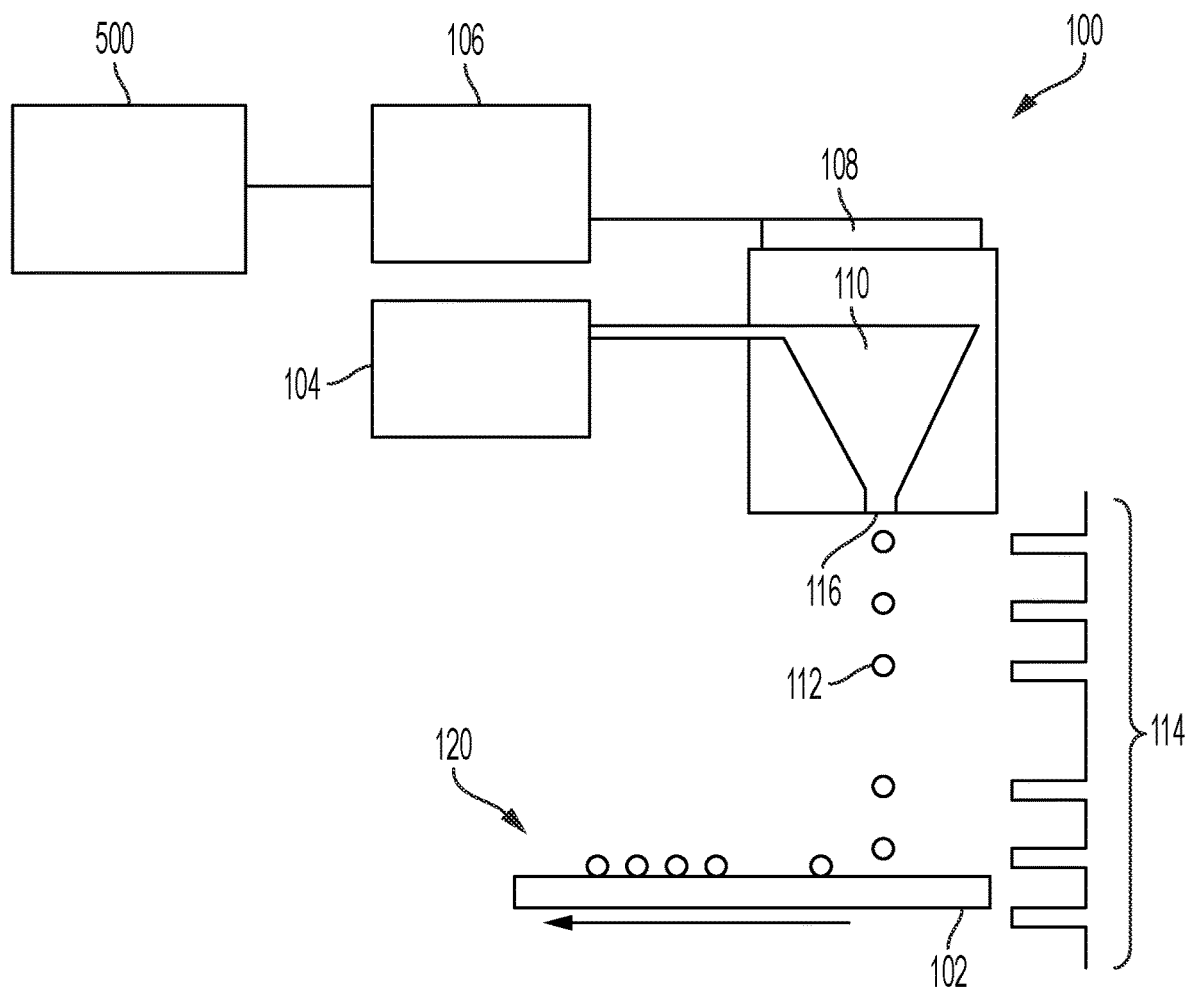
FIG. 1 is a schematic diagram of a system for forming an anti-tamper implementation method and apparatus using direct write methods according to embodiments of the present invention.

A detailed description of one or more embodiments of the disclosed implementation, apparatuses and methods are presented herein by way of exemplification and not limitation with reference to the Figures.

Providing ASIT security for sensitive technology presents various challenges. For example, many components, being commercial-off-the-shelf (COTS), are unmodifiable. Security technology is not utilized to adequately protect ASIT due to cost, availability of resources, and time to market. Further, the scope of security protection required for a particular technology or component may be too complex to justify its inclusion into a design. In these cases, but not limited to, physical destruction is a viable option when ASIT needs to be rendered unrecoverable, and where measures can be catastrophic and render the product inoperable or non-recoverable.

Accordingly, described herein are anti-tamper implementations resulting from additive manufacturing methods, as well as methods for controllable fracturing of integrated circuit silicon substrates and packages with such implementations. Additively manufactured (AM) energetic materials are deposited directly onto any integrated circuit substrate or package (component part or assembly) that can be controllably fractured when needed to protect sensitive technology. Methods of making components with anti-tamper features are formed by selectively depositing energetic materials in tailored geometries. AM methods, for example direct write methods and systems, aerosol jet methods and systems, and fused filament fabrication methods and systems, provide very precisely controlled and tailored application of a destruction mechanism on a surface of any shape or size, including components off the shelf. In some embodiments, the energetic materials are pyrotechnic materials or explosive materials. A non-limiting example of an energetic material includes nanothermites.

The methods, apparatuses and anti-tamper implementations described herein provide various advantages for some embodiments of the present invention. AM deposition of energetic materials reduces manufacturing time and cost, improves manufacturing/operator safety, and reduces manufacturing environmental impact. The anti-tamper implementations formed by AM methods include tailored, controllable chemistries and geometries, which are advantageously very thin and can be deposited onto any surface. The energetic materials are easily and controllably electrically initiated, which once initiated are exothermic reactions that at least partially fracture substrates to prevent tampering.

The term "about" is intended to include the degree of error associated with measurement of the particular quantity based upon the equipment available at the time of filing the application. In some embodiments, the term "about" means ±10, 9, 8, 7, 6, 5, 4, 3, 2, or 1% of the reported value, which depends on the particular parameter.

The term "energetic material" and other like terms mean materials with a high amount of stored chemical energy that can be released. Energetic materials described herein are pyrotechnics or explosives and do not include propellants.

The term "pyrotechnic" and other like terms mean substances that produce an effect by heat, light, sound, gas, or a combination thereof, as a result of non-detonative self-sustaining exothermic redox chemical reactions (i.e., deflagration).

As used herein, the term "explosive" and other like terms mean reactive substances that contain a large amount of potential energy that produce explosions and are accompanied by the production of heat, light, sound, and/or pressure (i.e., detonation).

Figure 2:
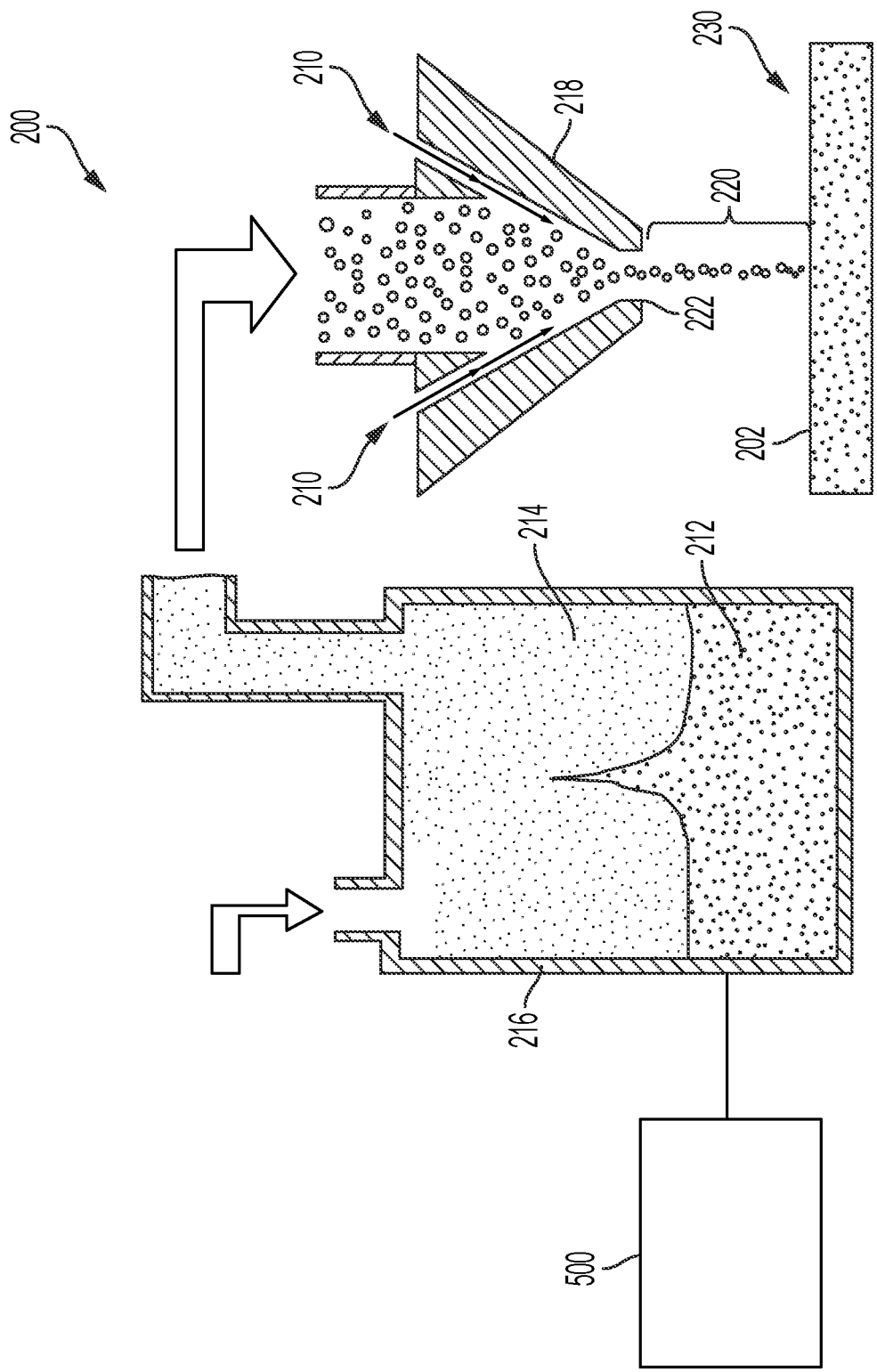
FIG. 2 is a schematic diagram of a system for forming an anti-tamper implementation method and apparatus using aerosol jet methods according to embodiments of the present invention.
Figure 3:
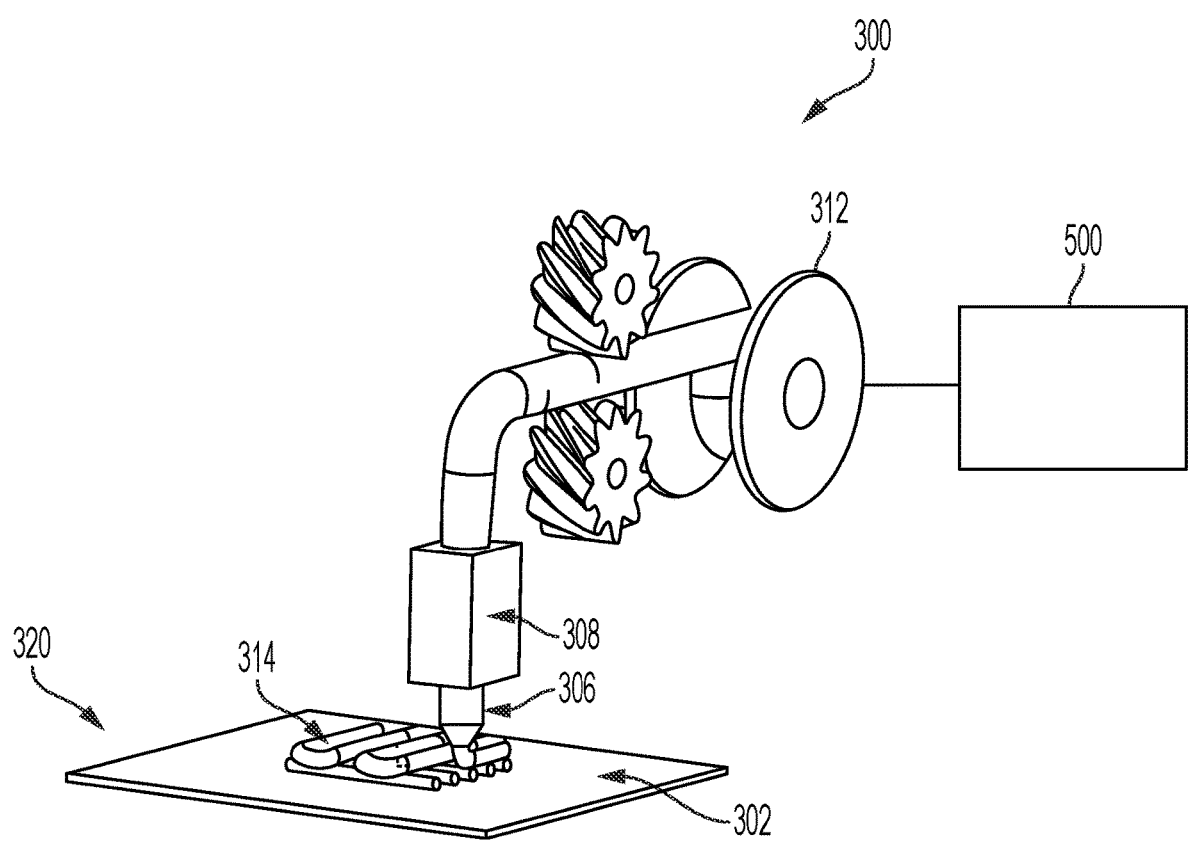
FIG. 3 is a schematic diagram of a system for forming an anti-tamper implementation method and apparatus using fused filament fabrication methods according to embodiments of the present invention.

FIGS. 1-3 depict a schematic diagram of forming anti-tamper implementations 120 using AM methods. FIG. 1 depicts a direct write system 100 according to embodiments of the present invention. The direct write system 100 is an ink jet system or an extrusion-based system, which depends on the liquid viscosity (percent solids). An energetic material 112 in a liquid suspension 110 is deposited onto a substrate 102 (or package) and cured to form an anti-tamper implementation 120. A drive signal 106 and actuator 108 dispense/extrude the energetic material 112 under controlled flow rates from a fluid supply 104 through a nozzle 116 onto a substrate 102 along a digitally defined path to form an anti-tamper implementation 120 on the substrate 102, which can be any component or assembly. The actuator pulse train 114 and relative movement between the nozzle 116 and substrate 102 defines the shape, pattern, and geometry of the energetic material 112 formed on the substrate 102. The nozzle 116 of the dispenser head with the liquid suspension moves in two dimensions to deposit one horizontal plane, or layer, at a time, and the work or the extruder head is then moved vertically by a small amount to begin a new layer.

The direct write system 100 is controlled by a controller 500 (see FIG. 5) and provides desirable dispensing control (e.g., down to 10 picoliters) and precise fine line width (e.g., down to 20 micrometers). The direct write system 100 also provides a desirable positional (x/y/z) accuracy (e.g., ±5 micrometers) and repeatability (e.g., ±1 micrometer). A rotary stage also allows for deposition onto any surface, including curved substrate 102 surfaces.

The energetic material 112 is a material with a high amount of stored chemical energy that can be released. The energetic materials 112 described herein are pyrotechnic materials in some embodiments. In other embodiments, the energetic materials 112 are explosive materials.

In some embodiments, the energetic materials 112 are nanothermite compositions. Nanothermite compositions are metastable intermolecular composites that include a metal (fuel) and a metal oxide (oxidizer). In some embodiments, the metal fuel has a particle size of about 50 to about 150 nanometers, and the metal oxide has a particle size of about 40 to about 50 nanometers. Nanothermites are distinguished from traditional thermites in that the oxidizer metal oxide and fuel are in the form of extremely fine powders (nanoparticles), which significantly increases the reactivity relative to traditional thermites. Advantageously in some embodiments, the nanosized metals in the nanothermite compositions are not sensitive to impact, friction, or heat. Non-limiting examples of nanothermite composites include aluminum-molybdenum (VI) oxide, aluminum-copper (II) oxide, aluminum-iron (II, III) oxide, aluminum-bismuth (III) oxide, and aluminum-tungsten (VI) oxide hydrate.

In some embodiments, the energetic materials are explosives. Non-limiting examples of explosives include cyclotetramethylene-tetranitramine (HMX), cyclotrimethylenetrinitramine (RDX), trinitrotoluene (TNT), hexanitrohexaazaisowurtzitan (CL-20), nitrocellulose (NC), or nitroglycerine (NG). Other non-limiting examples of explosives include intermetallics, for example, aluminum/titanium (Al/Ti) intermetallics, titanium/boron (Ti/B) intermetallics, aluminum/nickel (Al/Ni) intermetallics, titanium/carbon (Ti/C) intermetallics, platinum/aluminum (Pt/Al) intermetallics, nickel/titanium (Ni/Ti) intermetallics, cobalt/aluminum (Co/Al) intermetallics, or nickel/vanadium/aluminum (Ni/V/Al) intermetallics.

The direct write system 100 advantageously deposits a very small amount of the energetic material 112 onto the surface of the substrate 102 in a very thin layer. In some embodiments, the thickness of the layer of energetic material 112 formed on the substrate 102 is a film having a thickness of about 10 micrometers to about 10 millimeters. In other embodiments, the thickness of the layer of energetic material 112 formed on the substrate 102 is a film having a thickness of about 1 to about 10 micrometers. Yet, in other embodiments, the thickness of the layer of energetic material 112 formed on the substrate 102 is a film having a thickness about 1 micrometer to about 10 millimeters.

The substrate 102 onto which the energetic materials 112 are deposited can have any shape, size, or geometry. For example, the substrate 102 surface can be arbitrarily curved or even very small. The energetic materials 112 are deposited onto any commercial off the shelf component or a chip or intermediate chip/electronic structure. Non-limiting examples of substrates 102 include a bare die, a system in package (SiP), a circuit board, a microelectronic device, an electronic device, a backplane connector, an ethernet physical layer device, or a mobile phone Wi-Fi antenna.

The energetic materials 112 are electrically initiated to fracture, at least partially, or destroy the substrate 102 (component or part) and depending on the substrate 102 and energetic material used, varying levels of destruction are accomplished. In some embodiments, 1.2-2.5 Volts (~10-20 milliamperes) are used to initiate the reaction within a time of about 2.5 to about 10.5 microseconds.

In some embodiments, the energetic material is a nanothermite, and the initiator (e.g., electricity) melts the metal fuel, which reacts with the metal oxide. The resulting exothermic reaction fractures, at least partially, or destroys the substrate 102 (component or part) and depending on the substrate 102 and energetic material used, varying levels of destruction are accomplished.

FIG. 2 depicts an aerosol jet system 200 for forming an anti-tamper implementation 230 according to embodiments of the present invention. The energetic material in a liquid suspension 212 is arranged in an atomizer 216, which creates a dense mist 214 of micron-sized energetic material laden droplets. The aerosol mist 214 of the energetic material is delivered to the deposition head 218 where it is focused by a sheath gas 210, which surrounds the aerosol mist 214 as an annular ring. When the sheath gas 210 and aerosol mist 214 pass though the profiled nozzle 222, they accelerate and the aerosol becomes 'focused' into a tight stream 220 of droplets flowing inside the sheath gas 210. The sheath gas 210 (e.g., clean, dry nitrogen or compressed air) also serves to insulate the nozzle 222 from material contact to preventing clogging. The resulting high velocity particle stream 220 remains focused during its travel from the nozzle 222 to the substrate 202, maintaining feature resolution on non-uniform substrates 202. The deposition head 218 moves in two dimensions to deposit one horizontal plane, or layer, at a time, and the work or the deposition head 218 is then moved vertically by a small amount to begin a new layer. The system 200 is controlled via a controller 500 (see FIG. 5) to define the geometry of the deposited energetic material.

As described above, the energetic material deposited onto the substrate 202 is a material with a high amount of stored chemical energy that can be released. The energetic materials are pyrotechnic materials in some embodiments. In other embodiments, the energetic materials are explosive materials.

In some embodiments, the energetic materials are nanothermite compositions. Nanothermite compositions are metastable intermolecular composites that include a metal (fuel) and a metal oxide (oxidizer). In some embodiments, the metal fuel has a particle size of about 50 to about 150 nanometers, and the metal oxide has a particle size of about 40 to about 50 nanometers. Nanothermites are distinguished from traditional thermites in that the oxidizer metal oxide and fuel are in the form of extremely fine powders (nanoparticles), which significantly increases the reactivity relative to traditional thermites. Advantageously in some embodiments, the nanosized metals in the nanothermite compositions are not sensitive to impact, friction, or heat. Non-limiting examples of nanothermite composites include aluminum-molybdenum (VI) oxide, aluminum-copper (II) oxide, aluminum-iron (II, III) oxide, aluminum-bismuth (III) oxide, and aluminum-tungsten (VI) oxide hydrate.

In some embodiments, the energetic materials are explosives. Non-limiting examples of explosives include cyclotetramethylene-tetranitramine (HMX), cyclotrimethylenetrinitramine (RDX), trinitrotoluene (TNT), hexanitrohexaazaisowurtzitan (CL-20), nitrocellulose (NC), or nitroglycerine (NG). Other non-limiting examples of explosives include intermetallics, for example, aluminum/titanium (Al/Ti) intermetallics, titanium/boron (Ti/B) intermetallics, aluminum/nickel (Al/Ni) intermetallics, titanium/carbon (Ti/C) intermetallics, platinum/aluminum (Pt/Al) intermetallics, nickel/titanium (Ni/Ti) intermetallics, cobalt/aluminum (Co/Al) intermetallics, or nickel/vanadium/aluminum (Ni/V/Al) intermetallics.

The substrate 202 onto which the energetic materials 112 are deposited can have any shape, size, or geometry. For example, the substrate 202 surface can be arbitrarily curved or even very small. The energetic materials are deposited onto any commercial off the shelf component or a chip or intermediate chip/electronic structure.

The energetic materials of the anti-tamper implementation 230 are electrically initiated to fracture, at least partially, or destroy the substrate 202 (component or part). In some embodiments, the energetic material is a nanothermite, and the initiator (e.g., electricity) melts the metal fuel, which reacts with the metal oxide. The resulting exothermic reaction fractures, at least partially, or destroys the substrate 102 (component or part) and depending on the substrate 202 and energetic material used, varying levels of destruction are accomplished.

FIG. 3 depicts a fused filament fabrication system 300 for forming an anti-tamper implementation 320 according to embodiments of the present invention. A filament 314 of the energetic material is either fed from a spool 312, or the energetic material chemical constituents are otherwise admixed from other vessels directly upstream of dispensation (not shown), through a moving extruder head 308 through a nozzle 306 and deposited on the substrate 302. The extruder head 308 is controlled via a controller 500 (see FIG. 5) to define the printed shape. The extruder head 308 moves in two dimensions to deposit one horizontal plane, or layer, at a time, and the work or the extruder head 308 is then moved vertically by a small amount to begin a new layer. The speed of the extruder head 308 may also be controlled to stop and start deposition and form an interrupted plane without stringing or dribbling between sections.

As described above, the energetic material deposited onto the substrate 302 is a material with a high amount of stored chemical energy that can be released. The energetic materials are pyrotechnic materials in some embodiments. In other embodiments, the energetic materials are explosive materials.

In some embodiments, the energetic materials are nanothermite compositions. Nanothermite compositions are metastable intermolecular composites that include a metal (fuel) and a metal oxide (oxidizer). In some embodiments, the metal fuel has a particle size of about 50 to about 150 nanometers, and the metal oxide has a particle size of about 40 to about 50 nanometers. Nanothermites are distinguished from traditional thermites in that the oxidizer metal oxide and fuel are in the form of extremely fine powders (nanoparticles), which significantly increases the reactivity relative to traditional thermites. Advantageously in some embodiments, the nanosized metals in the nanothermite compositions are not sensitive to impact, friction, or heat. Non-limiting examples of nanothermite composites include aluminum-molybdenum (VI) oxide, aluminum-copper (II) oxide, aluminum-iron (II, III) oxide, aluminum-bismuth (III) oxide, and aluminum-tungsten (VI) oxide hydrate.

In some embodiments, the energetic materials are explosives. Non-limiting examples of explosives include cyclotetramethylene-tetranitramine (HMX), cyclotrimethylenetrinitramine (RDX), trinitrotoluene (TNT), hexanitrohexaazaisowurtzitan (CL-20), nitrocellulose (NC), or nitroglycerine (NG). Other non-limiting examples of explosives include intermetallics, for example, aluminum/titanium (Al/Ti) intermetallics, titanium/boron (Ti/B) intermetallics, aluminum/nickel (Al/Ni) intermetallics, titanium/carbon (Ti/C) intermetallics, platinum/aluminum (Pt/Al) intermetallics, nickel/titanium (Ni/Ti) intermetallics, cobalt/aluminum (Co/Al) intermetallics, or nickel/vanadium/aluminum (Ni/V/Al) intermetallics.

The substrate 302 onto which the energetic materials are deposited can have any shape, size, or geometry. For example, the substrate 302 surface can be arbitrarily curved or even very small. The energetic materials are deposited onto any commercial off the shelf component or a chip or intermediate chip/electronic structure.

The energetic materials of the anti-tamper architectures 320 are electrically initiated to destroy the substrate 302 (component or part). In some embodiments, the energetic material is a nanothermite, and the initiator (e.g., electricity) melts the metal fuel, which reacts with the metal oxide. The resulting exothermic reaction fractures, at least partially, or destroys the substrate 320 (component or part) and depending on the substrate 320 and energetic material used, varying levels of destruction are accomplished.

Figure 5:
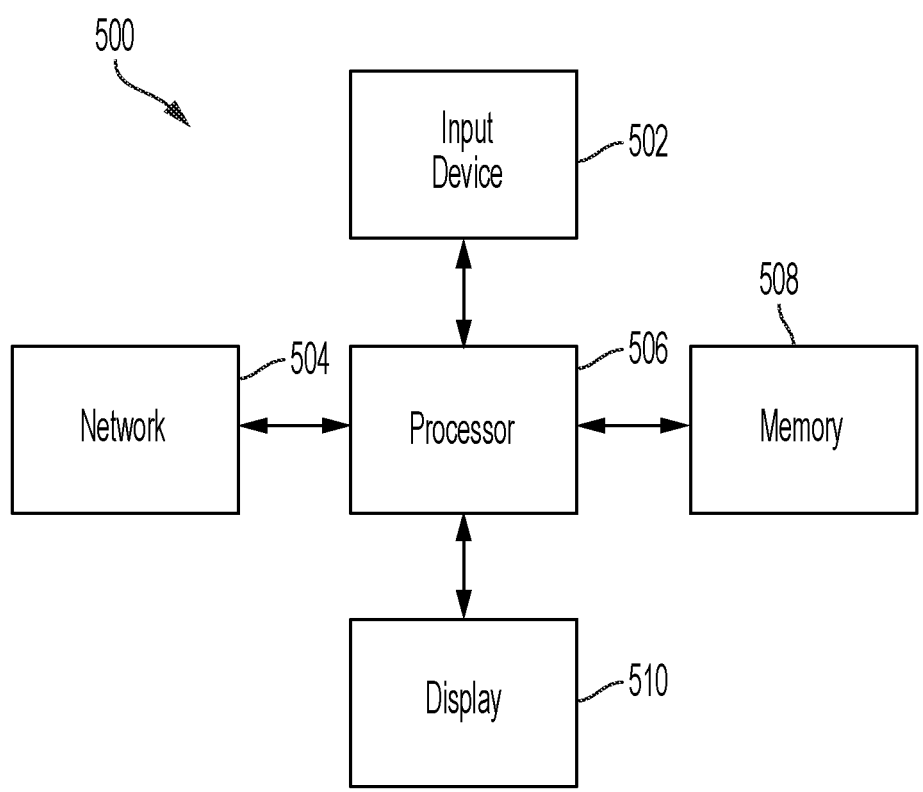
FIG. 5 depicts a controller for controlling the system, method, and apparatus for forming the anti-tamper implementation according to embodiments of the present invention.

As shown in FIG. 5, the systems 100, 200, 300 are driven by a controller 500 and standard CAD data which is converted to make a vector-based tool path. This tool path allows patterning of the energetic materials by driving a 2D or 3D motion control system. The controller 500 includes a processor 506 that is communicatively connected to an input device 502, a network 504, a memory 508, and a display 510. The input device 502 may include a keyboard, touchpad, mouse, or touch screen device, and the network 504 may include a local area network or the internet. The display 510 may include a screen, touch screen device or digital display. In some embodiments, the controller 500 includes a personal computer, smart phone or tablet device communicatively connected to the fabrication systems 100, 200, 300.

Figure 4A:
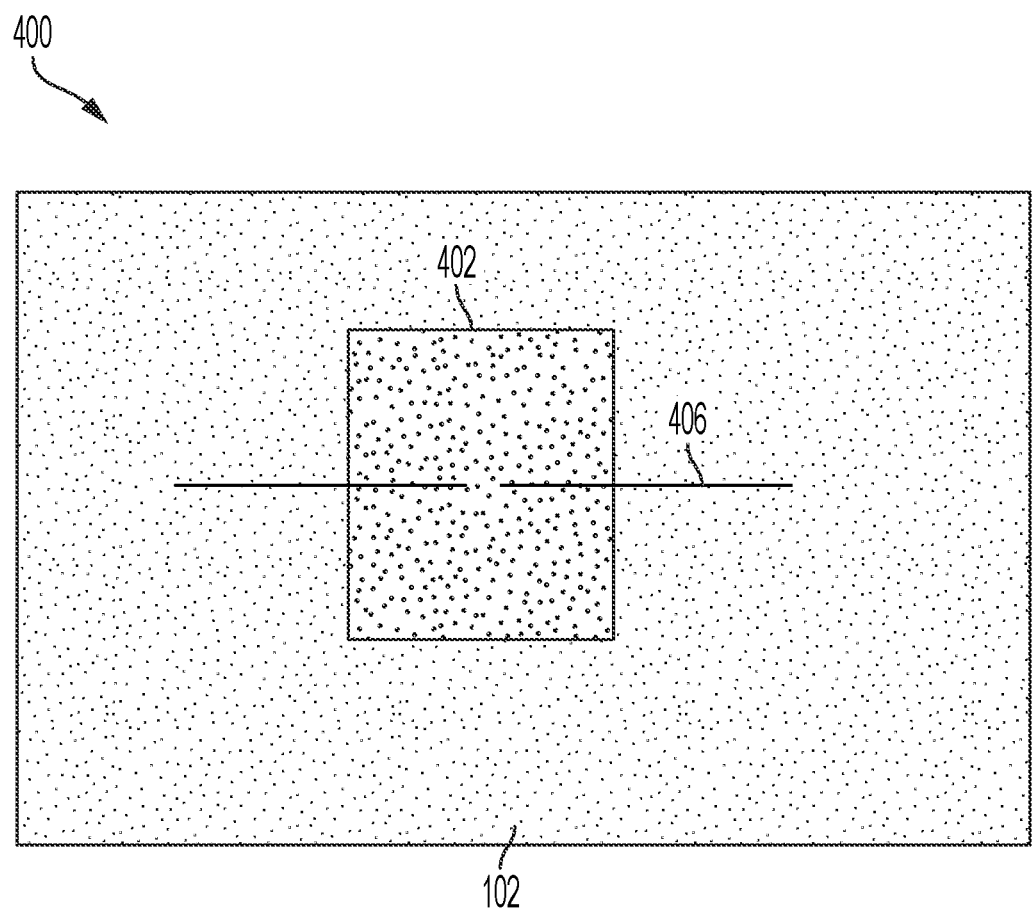
FIG. 4A depicts a schematic diagram of an anti-tamper implementation according to embodiments of the present invention.
Figure 4B:
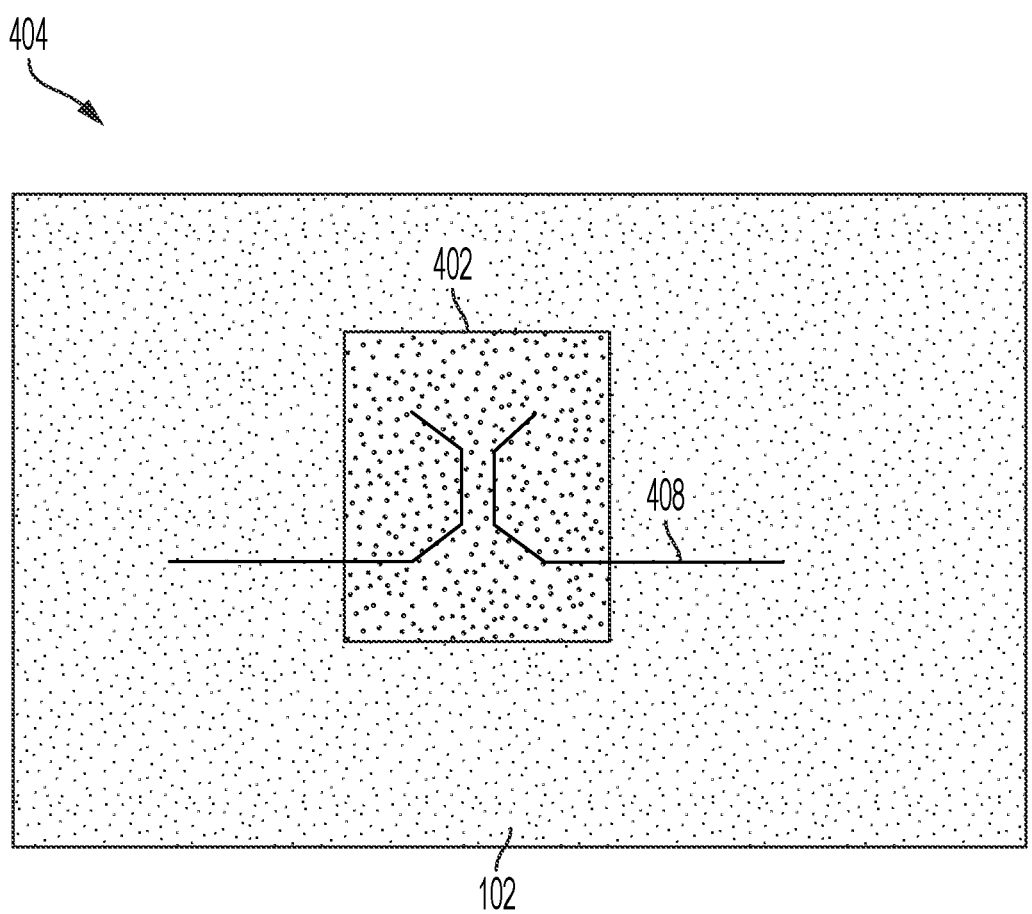
FIG. 4B depicts a schematic diagram of an anti-tamper implementation according to embodiments of the present invention.

FIGS. 4A and 4B depict schematic diagrams of anti-tamper implementations 400 and 404 according to embodiments of the present invention. In addition to using the above methods to deposit the energetic material 402 itself in the desired anti-tamper geometry, initiator electrical circuitry with a spark gap 406 (FIG. 4A) or radio frequency trigger 408 (FIG. 4B) including conductive interconnects and insulators, are also deposited by AM methods onto the substrate 102 in some embodiments. The initiator circuitry can be deposited by direct write systems 100, aerosol jet systems 200, or fused filament fabrication methods 300 described above. Yet, in other embodiments, the initiator circuitry is deposited by other suitable deposition methods. Using initiator circuitry to initiate the energetic material 112 prevents inadvertent triggering.

In addition to using electrical circuitry 406, other methods of initiating the energetic materials 112 include electromagnetic, laser heating, a radio frequency source, and mechanical initiators. After the energetic material are deposited onto the desired substrate, component, or assembly they can be initiated using the appropriate initiator to controllably fracture, at least partially, or destroy the substrate/component.

A non-limiting example of a mechanical initiator includes an ancillary release/combination of a two-component exothermic reaction that could be used as a primer to initiate the secondary energetic material. Such an initiator includes the fracture of a glass vial or barrier (upon tamper), releasing the primer reactants, and thus triggering the secondary reaction.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for forming an anti-tamper feature on an apparatus, the method comprising:
    depositing, by an additive manufacturing method, a layer of an energetic material on a surface of a substrate, the layer having a thickness of about 1 micrometer to about 10 millimeters;
    wherein a reaction of the energetic material is exothermic and at least partially fractures the substrate after the reaction is initiated;
    wherein the additive manufacturing method is a direct write method, an aerosol jet method, or a fused filament fabrication method.

2. The method of claim 1, wherein a metal of the energetic material has a particle size of about 50 to about 150 nanometers, and a metal oxide of the energetic material has a particle size of about 40 to about 50 nanometers.

3. The method of claim 1, wherein the energetic material is a pyrotechnic material or an explosive material.

4. The method of claim 1, wherein the energetic material is aluminum-molybdenum (VI) oxide, aluminum-copper (II) oxide, aluminum-iron (II, III) oxide, aluminum-bismuth (III) oxide, or aluminum-tungsten (VI) oxide hydrate.

5. The method of claim 1, wherein the reaction is a redox reaction.

6. The method of claim 1, wherein the substrate is a bare die, a system in package (SiP), a circuit board, a microelectronic device, an electronic device, a backplane connector, an ethernet physical layer device, or a mobile phone Wi-Fi antenna.

7. The method of claim 1, further comprising forming electrical circuitry for initiating the reaction of the energetic material on the substrate.

\* \* \* \* \*